United States Patent
Du

(10) Patent No.: US 9,853,265 B2
(45) Date of Patent: Dec. 26, 2017

(54) WATERPROOF REMOVABLE BATTERY

(71) Applicant: Xing Du, Newport Beach, CA (US)

(72) Inventor: Xing Du, Newport Beach, CA (US)

(73) Assignee: Xing Du, Newport Beach, CA (US)

(*) Notice: Subject to any disclaimer, the term of this patent is extended or adjusted under 35 U.S.C. 154(b) by 0 days.

(21) Appl. No.: 14/658,144

(22) Filed: Mar. 14, 2015

(65) Prior Publication Data

US 2016/0190530 A1    Jun. 30, 2016

Related U.S. Application Data

(63) Continuation-in-part of application No. 14/587,146, filed on Dec. 31, 2014, now abandoned.

(51) Int. Cl.
*H01M 2/08* (2006.01)
*H01M 2/10* (2006.01)

(52) U.S. Cl.
CPC ....... *H01M 2/1094* (2013.01); *H01M 2/1022* (2013.01); *H01M 2/1066* (2013.01); *H01M 2220/30* (2013.01)

(58) Field of Classification Search
None
See application file for complete search history.

(56) References Cited

U.S. PATENT DOCUMENTS

| 2004/0001997 A1* | 1/2004 | Zatezalo | G06F 1/163 |
| | | | 429/96 |
| 2013/0072757 A1* | 3/2013 | Mcgrath | A61B 1/00034 |
| | | | 600/188 |
| 2016/0190529 A1 | 6/2016 | Du | |

OTHER PUBLICATIONS

Jiang et al, Biological and Medical Physics, Biomedical Engineering, 28-61 (Sep. 2009).*
Columbia Engineered Rubber (website, Aug. 4, 2013 per the Wayback Machine).*
Mereco 1650 series cut-sheet (downloaded 2016).*
Mereco 1650 Series MSDS Sheet (2012).*
"U.S. Appl. No. 14/587,146, Non Final Office Action dated Aug. 9, 2016", 13 pgs.
"U.S. Appl. No. 14/587,146, Response filed May 18, 2016 to Restriction Requirement dated Mar. 22, 2016", 6 pgs.
"U.S. Appl. No. 14/587,146, Restriction Requirement dated Mar. 22, 2016", 5 pgs.
Ziebell, "Silicone Rubber in Extreme Environments", (Aug. 2, 2013).

* cited by examiner

Primary Examiner — Yoshitoshi Takeuchi
(74) Attorney, Agent, or Firm — Schwegman Lundberg & Woessner, P.A.

(57) ABSTRACT

This invention relates generally to waterproofing of a removable battery configured to prevent seeping of water into the battery component through the use of a rubber waterproof frame.

24 Claims, 3 Drawing Sheets

WATERPROOF REMOVABLE BATTERY

CROSS REFERENCE TO RELATED APPLICATIONS

The present application is a continuation in part of, and claims the benefit to, U.S. patent application Ser. No. 14/587,146 filed Dec. 31, 2014, the entire disclosure of which is incorporated herein by reference.

FIELD OF THE INVENTION

The present invention generally relates to removable batteries and in particular to waterproofing of batteries for electronic devices such as cellular phones, cameras, and players.

BACKGROUND OF THE INVENTION

Removable batteries are commonly employed to power electronic devices. In contrast to permanently embedded batteries, removable batteries are more likely to sustain damage, and thereby disabling use of the electronic device. Specifically, at an area of a battery housing where a removable battery may be detached from or where there is a door that provides access to a battery compartment, such areas remain pervious to external agents, such as water, that may cause damage to the electronic device or the removable battery itself. For instance, when external agents enter the electronic device through these points of access, they may damage and corrode sensitive components of the battery or the electronic device, such as contact terminals, SIM card slots and/or memory card slots.

Removable batteries have facilitated the use of numerous types of electronic devices. Specifically, removable batteries have contributed to the portability of such electronic device. However, since removable batteries are not permanently embedded within the electronic device, the battery housings of removable batteries or the components of an electronic device that secure a removable battery to the electronic device become susceptible to potentially damaging external agents, such as water. These environmental agents are able to enter into areas with sensitive electronic components via the seams of battery housings or gaps between a removable battery and securing components of the electronic device. Therefore, greater caution is required where there is an enhanced threat of environmental exposure and damage.

Water damage (or similar damage caused by other liquids) is one of the most undesirable problems that can affect an electronic device. Water that enters a device, for example through the removable battery compartment into the battery housing, can lead to numerous problems. In the short term water damage can cause short-circuiting of the electronic device. In the long term, water damage can corrode the internal metal parts of the electronic device. Accordingly, there is a need in the arts for a way to prevent water to permeate into an electronic device and allow for use of an electronic device in a wet or aqueous environment while simultaneously keeping the battery design streamlined.

Therefore, there is a need in the art for a removable battery usable with external devices and impermeable to external environmental agents such that the electronic device may continue to function properly, even when exposed to such external environmental agents. This and other features and advantages of the present invention will be explained and will become obvious to one skilled in the art through the summary of the invention that follows.

SUMMARY OF THE INVENTION

Accordingly, an embodiment of the present invention are directed to a battery seal comprising a waterproof frame comprising of a water-proof material and a compressible body having a mounting side and a seal side, wherein the waterproof frame is configured to be affixed at the mounting side along a perimeter of a least one battery wall containing one or more of a battery terminal, which is designed to mate with one or more corresponding parts within a battery housing of an electronic device, and wherein the battery seal is configured to engage with a battery housing at the seal side of the waterproof frame such that the waterproof frame plugs a junction between the battery wall and the battery housing.

According to an embodiment of the present invention, the waterproof frame is comprised of two or more water-proof materials.

According to embodiments of the present invention, the waterproof frame is configured to be fixed along a perimeter of at least one battery wall.

According to an embodiment of the present invention, the waterproof frame is configured to be fixed along a perimeter of at least one battery wall that comprises one or more of a battery connector.

According to an embodiment of the present invention, a waterproof frame is configured to be fixed along the perimeter of at least one battery wall housing one or more of an insertion slot for one or more of a memory chip.

An embodiment of the present invention is directed to a waterproof removable battery configured to prevent water permeation into a battery housing of an electronic device, comprising of a removable battery which has a top end, a bottom end, at least one battery wall, and one or more battery terminals, wherein said one or more battery terminals are configured to mate with one or more corresponding parts in a battery housing; a waterproof frame fixed along a perimeter of each of the battery walls containing at least one of said one or more battery terminals, wherein the waterproof frame is configured to engage with the battery housing such that the waterproof frame forms a watertight seal at a junction between the battery and the battery housing when the battery is inserted into the battery housing of the electronic device.

According to an embodiment of the present invention, the waterproof frame of the waterproof removable battery is constructed from one or more water-proof materials.

According to an embodiment of the present invention, the waterproof frame of the waterproof removable battery further surrounds an insertion slot for one or more of memory chips.

According to an embodiment of the present invention, the waterproof frame of the waterproof removable battery further surrounds one or more battery connectors.

According to an embodiment of the present invention, the waterproof frame of the waterproof removable battery is continuous and surrounds a circumference along one or more battery walls.

According to an embodiment of the present invention, the waterproof frame of the waterproof removable battery further surrounds one or more of an interfacing surface.

According to an embodiment of the present invention, the waterproof frame of the waterproof removable battery further surrounds one or more of an interaction component.

DETAILED SPECIFICATION

Figure 1:
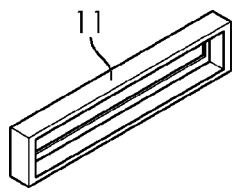
FIG. 1 is a perspective view of a battery seal in accordance with an embodiment of the present invention.

Embodiments of the present disclosure are now described in detail with reference to the accompanying drawings.

According to an embodiment of the present invention, a battery seal consists of a waterproof frame of waterproof material. In an embodiment of the current invention, the waterproof frame is composed of a rubber material. Other examples include silicone-based material such as siloxane, silane and silicone rubber. In other embodiments, a combination of waterproof materials can be used to construct the waterproof frame. One of ordinary skill in the art would appreciate that there are numerous types of waterproof materials that could be utilized, and embodiments of the present invention are contemplated for use with any appropriate waterproof material.

In addition to the composition of the waterproof material, such material must also be compressible. In order to form a seal that prevents seeping of water between the battery and the battery housing, the waterproof frame must have the ability to be forced into less space. Such adaptability into smaller space fills any gap that may result from the mating of the battery to the battery housing.

In certain embodiments of the claimed invention, the waterproof frame is fixed along a wall of battery. Accordingly, the waterproof frame can be adapted to conform to a variety of shapes and sizes depending on the shape of the battery wall and the portion of the electronic device the battery wall will contact with. In the case where the battery is cuboid (or similar to a cuboid but with rounded edges), the wall of the battery is square in nature. Therefore, the waterproof frame is configured to be a square structure. In the case where the battery is cylindrical, the battery wall may be circular, in which case the waterproof frame is also circular.

In other embodiments, the waterproof frame may be shaped differently than the shape of the battery. For instance, on a cuboid battery, a waterproof frame could be circular. In these embodiments, the important factor of the shape of the waterproof frame is that the waterproof frame is capable of creating a seal between the battery and electronic device such that the sensitive electrical contacts and other sensitive components (e.g., SIM card slot, memory card slot) are protected from external environmental agents.

In embodiments of the current invention, the waterproof frame is affixed to a wall comprising a battery terminal. The battery terminal is any component of the battery that makes an electrical contact with the electronic device. As an example, a cylindrical dry battery has two battery terminals: a protruding positive terminal on one end and a flat negative terminal on the other end. The positive terminal of a dry battery makes an electrical contact with one or more electrically conductive (e.g., metal) strips in the battery housing of an electronic device while the negative terminal mates with springs in the battery housing. Since the electrical contact between a battery terminal and the housing is necessary for the operation of the electronic device, embodiments of the present invention are designed to be affixed along the wall comprising such battery terminal.

The type of terminal does not limit the functionality of embodiments of the present invention. As examples, a battery terminal can consist of coil springs, as found in six-volt lantern batteries or as flat bases as may exist on the batteries of cellular phones.

The battery may also include other functional components that interact with non-battery parts. For example, the battery may include one or more functional components required for wireless charging. Alternatively, the battery terminal may also include one or more functional components for Near Field Communication (NFC) or other forms of communications (e.g., WIFI, CDMA, GSM).

Figure 6:
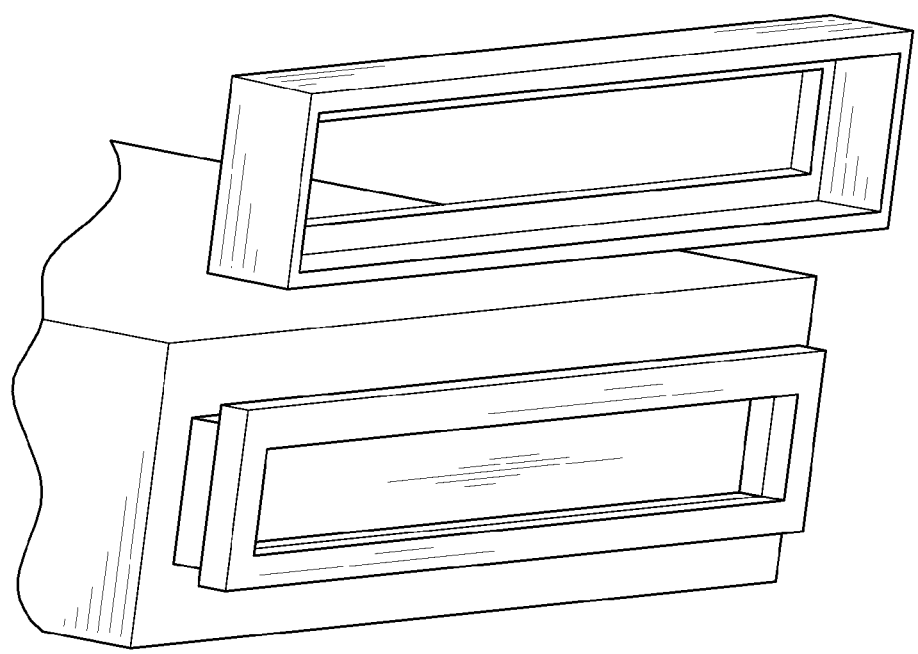
FIG. 6 is a perspective view of a waterproof frame, in accordance with an embodiment of the present invention.
Figure 7:
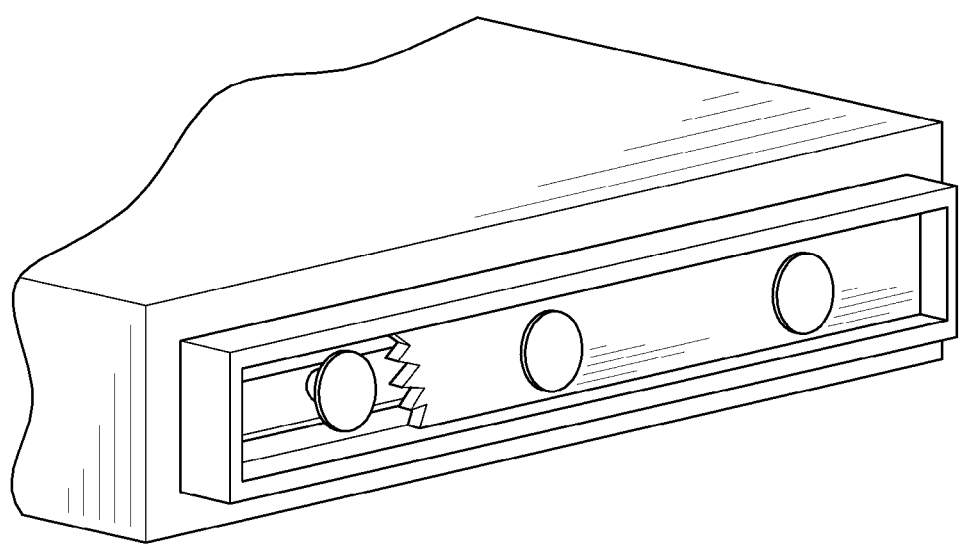
FIG. 7 is a perspective view of a waterproof frame, in accordance with an embodiment of the present invention.

According to an embodiment of the present invention, the waterproof frame may be affixed to the battery or the battery housing by one or more affixing means. In preferred embodiments of the present invention, affixing means may include, but are not limited to, drying adhesives such as white glue, contact adhesives, and rubber cement. In other embodiments, the waterproof frame may be affixed to a battery via a friction fit or interference fit or other engagement between one or more walls of a battery and the waterproof frame (See, FIG. 6). In still further embodiments, affixing means may be screws, pins, bolts or the like, wherein the affixing means attach the waterproof frame to the battery and engage with corresponding receiving points (e.g., screw holes) on the battery (See, FIG. 7). Other embodiments utilize hot adhesives such as styrene block copolymers (SBC). One of ordinary skill in the art would appreciate that there are numerous types of affixing means or other means for fastening the frame to the battery or battery housing that could be utilized, and embodiments of the present invention are contemplated for use with any appropriate affixing means or other means for fastening the frame to the battery or battery housing.

In general, a battery housing is one or more of a chamber that holds a battery within an electronic device. Components of the battery housing must make at least some electrical contact with components of the battery (typically the battery terminal) in order to allow for the operation of the electronic device.

In embodiments of the claimed invention, the battery seal does not interfere with the function of the battery in operating the electronic device. The claimed invention is intended to plug any resulting crevice or junction when a removable battery is inserted into its corresponding battery housing within the electronic device. Accordingly, the claimed invention is designed such that the waterproof frame of the battery seal does not interfere with any mating components between the battery and the battery housing.

Multiple types of batteries are envisioned to be affixed with the claimed invention to render the electronic device housing the battery impermeable to water. Such batteries may have additional functional components that may require protection against water damage. Accordingly, embodiments of the current invention include a waterproof frame affixed around or otherwise beyond such functional components of the battery such as to provide protection for the functional components as well as the terminals of the battery. Functional components include one or more of insertion slots for one or more of memory chips. Such functional components are typical of a cellular phone battery. For example, cellular phone batteries may include insertion slots for memory cards and/or Subscriber Identity Module (SIM) cards along the wall of a battery.

In certain embodiments, the battery may connect to an electronic device, where the electronic device has functional components in or around the same area where the battery connects to the electronic device. For instance, the battery compartment of an electronic device may also house slots for memory cards and/or SIM cards. In these embodiments, the waterproof frame may be affixed to the battery such that the functional components of the electronic device, as well as the electrical terminals, are protected by the seal formed when the waterproof frame engages between the battery and the electronic device.

Figure 2:
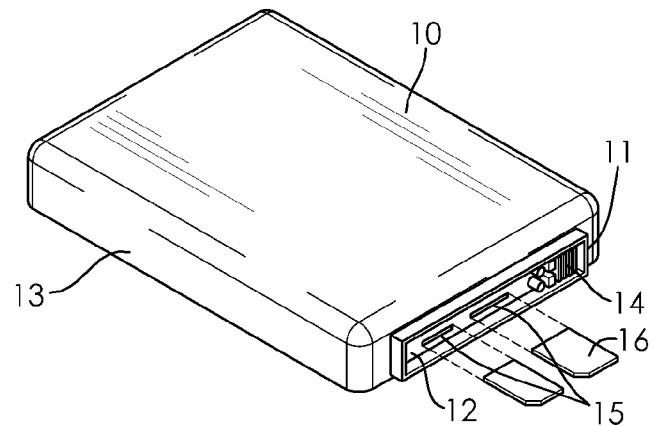
FIG. 2 is a perspective view of a waterproof removable battery in accordance with an embodiment of the present invention.
Figure 3:
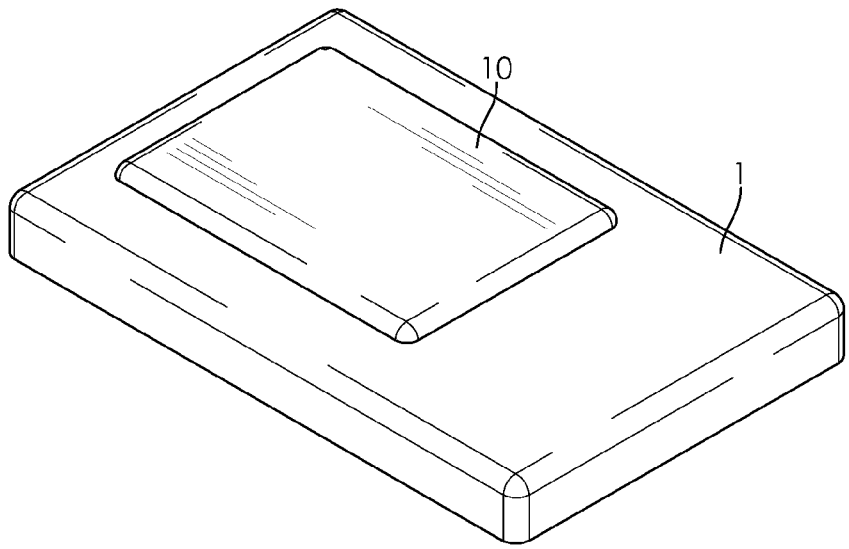
FIG. 3 is a perspective view of a waterproof removable battery in accordance with an embodiment of the present invention.
Figure 4:
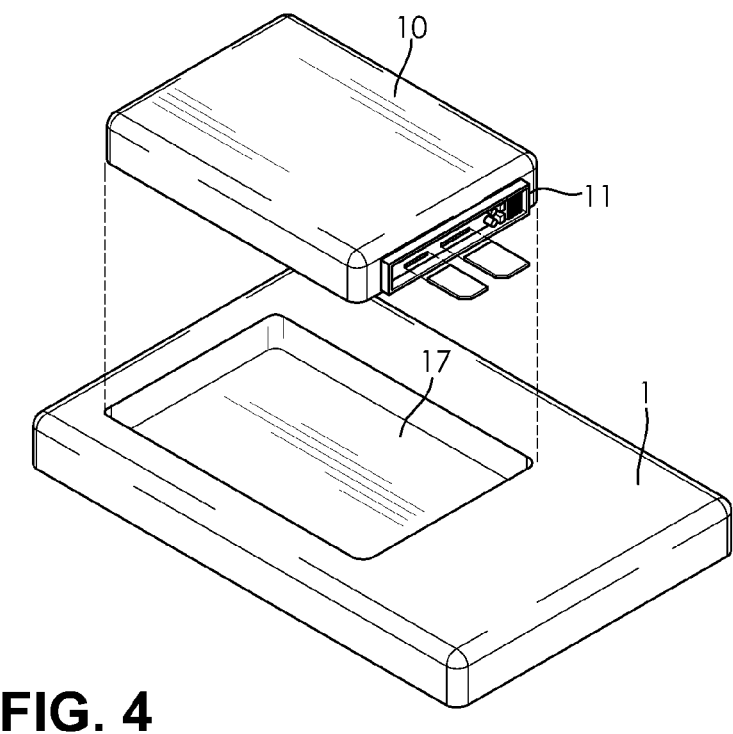
FIG. 4 is a perspective view of a waterproof removable battery in accordance with an embodiment of the present invention.

FIG. 2, FIG. 3 and FIG. 4, display a waterproof removable battery (10) configured to prevent water permeation into a battery housing (17) of an electronic device (1). The battery comprises a removable battery with a top end, a bottom end, at least one battery wall (13), one or more battery terminals (12) to mate with corresponding parts in the battery housing (17), and a waterproof frame (11) affixed along the perimeter of at least one battery wall (13) containing the battery terminal (12). The waterproof frame (11) engages with the battery housing (17) such that the waterproof frame (11) seals a junction between the battery (10) and the battery housing (17) when the battery (10) is inserted into the battery housing (17) of an electronic device (1).

In the current embodiment, the waterproof frame (11) espouses a rectangular shape. The waterproof frame can be adapted into any shape or size depending on the configuration of the wall comprising the battery terminal (12).

In an embodiment of the current invention, in the case where the battery has multiple battery terminals at different walls, each battery terminal (12) is surrounded by a waterproof frame (11) at each wall (13).

Figure 5:
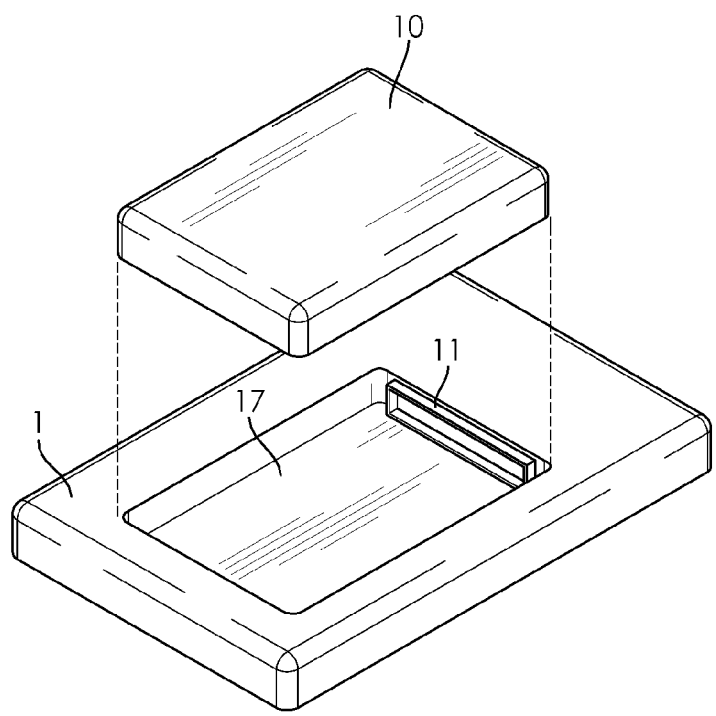
FIG. 5 is a perspective view of a waterproof removable battery in accordance with an embodiment of the present invention.

FIG. 5 displays a waterproof removable battery (10) configured to prevent water permeation into a battery housing (17) of an electronic device (1). The battery comprises a removable battery with a top end, a bottom end, at least one battery wall (13), one or more battery terminals (12) to mate with corresponding parts in the battery housing (17), and a waterproof frame (11) affixed on a wall of the battery housing (17). The waterproof frame (11) engages with the battery housing (17) such that the waterproof frame (11) seals a junction between the battery (10) and the battery housing (17) when the battery (10) is inserted into the battery housing (17) of an electronic device (1).

In addition to battery terminals, there may be additional interfacing battery surfaces that require protection from water damage. Accordingly, in embodiments of the current invention, a waterproof frame surrounds such interfacing battery surfaces. The interfacing surface is a battery wall that contains functional parts of the battery that have at least one interactive component that interacts with at least one non-battery part. These interactions may be physical or non-physical (e.g. electrical, digital, magnetic, electromagnetic, or thorough radio waves, etc). In other embodiments of the current invention, a waterproof frame surrounds one or more interaction components rather than the entire surface.

Types of interaction components include connectors (14) required to properly configure a battery within a battery housing or connectors serving to provide appropriate electrical connections for functioning of the battery. As an example specific to cell phones, battery connector pinouts include a thermistor, which monitors internal temperature during charging. Accordingly, in an embodiment of the current invention, a waterproof removable battery (10) is surrounded with a waterproof frame (11) along the perimeter of a battery wall that contains connectors (14).

In certain embodiments of the present invention, the waterproof frame (11) can be configured to interface or otherwise mate with a mating groove in order to provide a more secure fit between the waterproof removable battery (10) and battery housing (17). A mating groove can be a channel or other indentation or similar structure that is intended to receive all or a portion of the waterproof frame (11) in it in order to provide the waterproof seal. In embodiments where the waterproof frame (11) is mounted to the waterproof removable battery (10), the mating groove would be on the battery housing (17) and in embodiments where the waterproof frame (11) is attached to the battery housing (17), the mating groove would be on the waterproof removable battery (10).

In certain embodiments of the present invention, the waterproof seal formed by the waterproof frame (11) may further be a hermetic seal, preventing not just water, but also dust, air or any other particulate of any size. One of ordinary skill in the art would appreciate that there are numerous types of waterproof seals that could be formed, including hermetic seals, and embodiments of the present invention are contemplated for use with any appropriate type of seal formation.

In an embodiment of the current invention, a battery will have one or more components for wireless charging. For example, the wireless charging component may include one or more of an induction coil to receive or transmit an alternating electromagnetic field. In other embodiments of the current invention, a waterproof frame surrounds at least a portion of a wireless charging component (e.g., wireless charging coil connectors).

In an embodiment of the current invention, an interfacing battery surface will have one or more of an communication components for wireless communications (e.g., NFC). For example, the communication components may include one or more of an antenna employed for NFC, an antenna employed for WIFI signals, an antenna employed for cellular signals (e.g., GSM, CDMA). In other embodiments of the current invention, a waterproof frame surrounds at least a portion of a communications component (e.g., antenna connectors).

In embodiments of the invention, a battery may have multiple waterproof frames: one at a wall having a terminal and another waterproof frame at a wall having an interfacing surface and/or one or more of a functional component (e.g., wireless charging component, communications component). Alternatively, embodiments of the current invention require only a single waterproof frame if a terminal and a functional component are located at the same wall.

In an embodiment of the current invention, an additional waterproof frame (11) surrounds the wall containing insertion slots for one or more memory chips (15). Such memory chips include a subscriber identification module (SIM) card and a memory card (16). In an exemplary embodiment, a single waterproof frame (11) collectively borders a battery terminal (12) and insertion slots (15) for one or more memory chips (16).

In an embodiment of the current invention, a waterproof removable battery (10) is surrounded by a waterproof frame (11) at each wall of the battery. This embodiment seals any gap or crevice that is formed by the insertion of a removable battery within a battery housing of an electronic device.

Instead of having multiple waterproof frames at multiple walls surrounding necessary electronic components, the waterproof frame can be configured such that a waterproof frame wraps the circumference or perimeter of the battery itself at the top end.

In still further embodiments, instead of the waterproof frame being attached to the battery, the waterproof frame may be attached to the battery housing and mate with the battery such as to form the waterproof seal between the battery housing and the battery so that the components are appropriately protected.

The manners in which the waterproof removable battery is removed or inserted are disclosed. As displayed in FIG. 4, the current invention may be removed by lifting the battery out of the battery component while current invention may be inserted by pushing the waterproof replaceable battery into the battery compartment. Alternatively, the battery may be removed and inserted by sliding the battery out of or into the battery housing.

While preferred embodiments of the present invention described above have focused on watertight seals being formed between a battery and an electronic device via a seal formed there between, one of ordinary skill in the art would appreciate that other types of seals could be formed as well. For instance, seals could be formed, where the components to be protected from exposure to air or other particulate that would surpass a watertight seal. Further embodiments may not have a seal that is watertight, such as seals that are merely adapted to prevent larger particulate (e.g., dirt, debris) from entering into the battery compartment. These seals are contemplated for use with embodiments of the present invention.

While multiple embodiments are disclosed, still other embodiments of the present invention will become apparent to those skilled in the art from this detailed description. The invention is capable of myriad modifications in various obvious aspects, all without departing from the spirit and scope of the present invention. Accordingly, the drawings and descriptions are to be regarded as illustrative in nature and not restrictive.

The invention claimed is:

1. A waterproof electronic device including a battery housing, the battery housing having a battery housing wall, the battery housing wall containing one or more battery terminal receptacles, the waterproof electronic device comprising:
   a removable battery including a battery wall and one or more battery terminals configured to mate with the one or more battery terminal receptacles;
   one or more functional components including one or more insertion slots for one or more of a memory card or a subscriber identity module (SIM) card; and
   a waterproof frame fixed on the battery wall and configured to engage between the battery and the battery housing such that the waterproof frame seals a junction between the battery wall and the battery housing, the waterproof frame surrounding the one or more battery terminals and the one or more functional components.

2. The waterproof electronic device of claim 1, wherein the waterproof frame is constructed of one or more waterproof materials.

3. The waterproof electronic device of claim 2, wherein the one or more waterproof materials comprise a compressible material.

4. The waterproof electronic device of claim 3, wherein the one or more waterproof materials comprise a rubber material.

5. The waterproof electronic device of claim 3, wherein the one or more waterproof materials comprise a silicone-based material.

6. The waterproof electronic device of claim 2, wherein the one or more waterproof materials comprise two or more waterproof materials.

7. The waterproof electronic device of claim 2, wherein the removable battery further comprises one or more battery connectors, and the waterproof frame further surrounds the one or more battery connectors.

8. The waterproof electronic device of claim 2, wherein the waterproof frame is continuous and surrounds a circumference of the battery housing.

9. The waterproof electronic device of claim 2, wherein the battery comprises one or more interface surfaces, and the waterproof frame surrounds the one or more interfacing surfaces.

10. The waterproof electronic device of claim 1, wherein the removable battery further comprises one or more battery connectors, and the waterproof frame further surrounds the one or more battery connectors.

11. The waterproof electronic device of claim 1, wherein the waterproof frame is continuous and surrounds a circumference of the battery or the battery housing.

12. The waterproof electronic device of claim 1, wherein the battery comprises one or more interface surfaces, and the waterproof frame surrounds the one or more interfacing surfaces.

13. The waterproof electronic device of claim 1, wherein the battery comprises one or more functional components.

14. The waterproof electronic device of claim 1, wherein the waterproof frame forms a hermetic seal between the battery wall and the battery housing wall when being engaged between the battery and the battery housing.

15. The waterproof electronic device of claim 1, wherein the waterproof frame is fixed on the battery housing wall.

16. The waterproof electronic device of claim 15, wherein the waterproof frame forms a hermetic seal between the battery wall and the battery housing wall when being engaged between the battery and the battery housing.

17. The waterproof electronic device of claim 1, wherein the waterproof frame forms a hermetic seal between the battery wall and the battery housing wall when being engaged between the battery and the battery housing.

18. The waterproof electronic device of claim 1, wherein the battery comprises a wireless charging component for wireless charging, and the waterproof frame surrounds at least a portion of the wireless charging component.

19. The waterproof electronic device of claim 1, wherein the battery comprises a communication component for wireless communication, and the waterproof frame surrounds at least a portion of the communication component.

20. A waterproof electronic device including a battery housing, the battery housing having a battery housing wall, the battery housing wall containing one or more battery terminal receptacles, the waterproof electronic device comprising:

a removable battery including a battery wall and one or more battery terminals configured to mate with the one or more battery terminal receptacles;

one or more functional components including one or more insertion slots for one or more of a memory card or a subscriber identity module (SIM) card; and a waterproof frame fixed on the battery housing wall or on the battery wall and configured to engage between the battery and the battery housing such that the waterproof frame seals a junction between the battery wall and the battery housing, the waterproof frame surrounding the one or more battery terminals and the one or more functional components, wherein the battery wall contains the one or more battery terminals, wherein the one or more insertion slots comprise an insertion slot for the memory card.

21. The waterproof electronic device of claim 20, wherein the waterproof frame is fixed on the battery housing wall.

22. The waterproof electronic device of claim 20, wherein the waterproof frame is fixed on the battery wall.

23. The waterproof electronic device of claim 20, wherein the battery comprises a wireless charging component for wireless charging, and the waterproof frame surrounds at least a portion of the wireless charging component.

24. The waterproof electronic device of claim 20, wherein the battery comprises a communication component for wireless communication, and the waterproof frame surrounds at least a portion of the communication component.

\* \* \* \* \*